(12) United States Patent
Takami

(10) Patent No.: US 7,466,355 B2
(45) Date of Patent: Dec. 16, 2008

(54) ELECTRONIC SYSTEM FOR REDUCING POWER SUPPLY VOLTAGE

(75) Inventor: Satoshi Takami, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 786 days.

(21) Appl. No.: 10/781,696

(22) Filed: Feb. 20, 2004

(65) Prior Publication Data

US 2004/0165104 A1 Aug. 26, 2004

(30) Foreign Application Priority Data

Feb. 21, 2003 (JP) .............................. 2003-045071

(51) Int. Cl.
*H04N 5/335* (2006.01)
(52) U.S. Cl. ...................................... 348/312
(58) Field of Classification Search ................. 348/372, 348/312; 323/349, 351; 361/18
See application file for complete search history.

(56) References Cited

U.S. PATENT DOCUMENTS

| | | | |
|---|---|---|---|
| 4,250,413 A | 2/1981 | Kawasaki et al. | |
| 4,516,168 A * | 5/1985 | Hicks | 348/730 |
| 4,872,069 A | 10/1989 | Takami et al. | |
| 5,061,957 A | 10/1991 | Nishikawa et al. | |
| 5,095,226 A | 3/1992 | Tani et al. | |
| 5,600,521 A * | 2/1997 | Kondo | 361/18 |
| 6,429,728 B1 * | 8/2002 | Zabinski | 327/540 |
| 7,046,293 B1 * | 5/2006 | Nagase | 348/372 |
| 2003/0020821 A1 * | 1/2003 | Watanabe et al. | 348/312 |
| 2003/0025823 A1 * | 2/2003 | Watanabe et al. | 348/372 |

OTHER PUBLICATIONS

NJM317 Data Sheet: Adjustable 3-Terminal Positive Voltage Regulator pp. 1-7 which was published in Japan on Jul. 18, 2003.

* cited by examiner

*Primary Examiner*—David Ometz
*Assistant Examiner*—Nicholas G Giles
(74) *Attorney, Agent, or Firm*—Greenblum & Bernstein, P.L.C.

(57) ABSTRACT

There is provided a method of reducing a power supply voltage which is supplied from a voltage regulator to at least one particular circuit, the voltage regulator being configured to adjust its output voltage by use of an external output voltage setting circuit connected thereto, a switching element being used to connect an output voltage setting terminal of the voltage regulator to a ground via a predetermined resistance. The method includes turning off the switching element so that the output voltage of the voltage regulator is set at a preset power supply voltage for enabling the at least one particular circuit, and turning on the switching element so that the output voltage of the voltage regulator is reduced to a predetermined voltage lower than the preset power supply voltage.

4 Claims, 3 Drawing Sheets

ELECTRONIC SYSTEM FOR REDUCING POWER SUPPLY VOLTAGE

BACKGROUND OF THE INVENTION

The present invention relates to an electronic system and a method for reducing power supply voltage which is supplied by a voltage regulator to an electronic device, in order to protect the electronic device when a certain failure occurs to the electronic device.

Electronic devices such as electronic endoscopes are desired to be equipped with a power supply interruption system for interrupting power supply voltage which is supplied to a particular circuit of the electronic device (e.g., a CCD and a CCD driving circuit of the electronic endoscope) in order to protect the circuit when the certain failure occurred to the electronic device.

FIG. 3 is a circuit diagram showing an example of a conventional power supply interruption system. The power supply interruption system of FIG. 3 controls power supply voltage which is supplied to a CCD circuit, including a timing generator 140, an inverter 150, a CCD driving circuit 160 and a CCD 110, provided in an electronic endoscope (i.e., an electronic device). A preset DC voltage generated by a power supply 103 is converted by a regulator unit 120 into a proper DC power supply voltage. The DC power supply voltage converted by the regulator unit 120 is supplied to the CCD circuit.

The switching element 130, being operated by a control signal S1 supplied from a CPU (Central Processing Unit) 170, controls the conduction/interruption of electric power supplied from the regulator unit 120 to the timing generating circuit 140, the inverter 150, the CCD driving circuit 160 and the CCD 110. A pulse signal generated by the timing generating circuit 140 is inputted to the CCD driving circuit 160 via the inverter 150. The CPU 170 has a function for determining whether or not failure has occurred to the electronic device of the electronic endoscope.

When a certain electronic failure occurs in the electronic endoscope, the CPU 170 operates the switching element 130 and thereby interrupts the power supply voltage supplied from the regulator unit 120 to the timing generating circuit 140, the inverter 150, the CCD driving circuit 160 and the CCD 110. By the mechanism, the power supply voltage and the pulse signal which are inputted to the CCD driving circuit 160 are interrupted in case of the certain failure of the electronic endoscope, by which a particular circuit (CCD driving circuit 160 and CCD 110) is protected.

As described above, the conventional power supply interruption device protects the particular circuit of the electronic device by turning the switching element off when the certain failure is found. However, due to the switching element connected in series with the power supply line supplying electric power to the particular circuit to be protected in case of failure, constant voltage drop is caused by the resistance of the switching element in the normal state (normal operation) of the electronic device.

Further, individual difference of the switching element makes the setting of power supply voltage complicated and troublesome. In addition, since the switching element is connected in series with the line supplying electric power to the parts, an expensive power device has to be used as the switching element, by which manufacturing cost of the electronic device increases.

SUMMARY OF THE INVENTION

The present invention is advantageous in that it provides a method and a system capable of protecting a particular circuit of an electronic device by reducing a power supply voltage when a certain failure occurs in the particular circuit of the electronic device without causing a voltage drop in a normal operating state of the particular circuit.

According to an aspect of the invention, there is provided a method of reducing a power supply voltage which is supplied from a voltage regulator to at least one particular circuit, the voltage regulator being configured to adjust its output voltage by use of an external output voltage setting circuit connected thereto, a switching element being used to connect an output voltage setting terminal of the voltage regulator to a ground via a predetermined resistance. The method includes turning off the switching element so that the output voltage of the voltage regulator is set at a preset power supply voltage for enabling the at least one particular circuit, and turning on the switching element so that the output voltage of the voltage regulator is reduced to a predetermined voltage which is lower than the preset power supply voltage.

With this configuration, the at least one particular circuit can be protected, e.g., when a certain failure occurs in the at least one particular circuit, by reducing the output voltage of the voltage regulator to the predetermined voltage, without causing a voltage drop in a normal operating state of the at least one particular circuit. Further, since the output voltage setting terminal of the voltage regulator can be connected to the ground directly or via a resistance, the ON/OFF control of the switching element can be performed easily with reference to the ground level.

Optionally, the predetermined voltage may be substantially equal to a reference voltage of the voltage regulator, the reference voltage being lower than an operating voltage of the at least one particular circuit.

Still optionally, the method may include determining in advance whether the at least one particular circuit is in a normal operating condition or in an abnormal operating condition. In this case, the turning on the switching element step is performed when it is determined that the at least one particular circuit is in the abnormal operating condition by the determining step.

According to another aspect of the invention, there is provided a power supply voltage reduction system for reducing a power supply voltage which is supplied to at least one particular circuit from a voltage regulator. The power supply voltage reduction system includes an output voltage setting circuit that is connected to the voltage regulator to adjust an output voltage of the voltage regulator, a switching element that is used to connect an output voltage setting terminal of the voltage regulator to a ground via a predetermined resistance, and a controller that controls an on/off state of the switching element. The controller switches the switching element to one of the on and off states so that the output voltage of the voltage regulator is reduced to a predetermined voltage which is lower than a preset power supply voltage.

With this configuration, the at least one particular circuit can be protected, e.g., when a certain failure occurs in the at least one particular circuit, by reducing the output voltage of the voltage regulator to the predetermined voltage, without causing a voltage drop in a normal operating state of the at least one particular circuit. Further, since the output voltage setting terminal of the voltage regulator can be connected to the ground directly or via a resistance by the switching element, the ON/OFF control of the switching element can be performed easily with reference to the ground level.

Optionally, the controller may turn off the switching element so that the output voltage of the voltage regulator is set at the preset power supply voltage for enabling the at least one particular circuit, and may turn on the switching element so that the output voltage of the voltage regulator is reduced to the predetermined voltage lower than the preset power supply voltage.

Still optionally, the predetermined voltage may be substantially equal to a reference voltage of the voltage regulator, the reference voltage being lower than an operating voltage of the at least one particular circuit.

Still optionally, the power supply voltage reduction system may include a monitoring system that monitors the at least one particular circuit to determine whether the at least one particular circuit is in a normal operating condition or in an abnormal operating condition. In this case, the controller turns on the switching element when the monitoring system determines that the at least one particular circuit is in the abnormal operating condition.

According to another aspect of the invention, there is provided a CCD driving system, which includes a CCD driving circuit that outputs a driving signal for driving a CCD, a timing generator that generates and outputs a pulse signal for driving the CCD driving circuit, a voltage regulator that supplies a preset power supply voltage to the CCD driving circuit and the timing generator, and an output voltage setting circuit that is connected to the voltage regulator to adjust an output voltage of the voltage regulator. The CCD driving system further includes a switching element that is used to connect an output voltage setting terminal of the voltage regulator to a ground via a predetermined resistance, and a controller that controls an on/off state of the switching element, the controller switches the switching element to one of the on and off states so that the output voltage of the voltage regulator is reduced to a predetermined voltage which is lower than the preset power supply voltage.

With this configuration, the CCD driving circuit and the timing generator can be protected, e.g., when a certain failure occurs in the CCD driving circuit and the timing generator, by reducing the output voltage of the voltage regulator to the predetermined voltage, without causing a voltage drop in a normal operating state of the CCD driving circuit and the timing generator. Further, since the output voltage setting terminal of the voltage regulator can be connected to the ground directly or via a resistance by the switching element, the ON/OFF control of the switching element can be performed easily with reference to the ground level.

Optionally, the controller may turn off the switching element so that the output voltage of the voltage regulator is set at the preset power supply voltage for enabling the CCD driving circuit and the timing generator, and may turn on the switching element so that the output voltage of the voltage regulator is reduced to the predetermined voltage lower than the preset power supply voltage.

Still optionally, the predetermined voltage may be substantially equal to a reference voltage of the voltage regulator, the reference voltage being lower than an operating voltage of the CCD driving circuit and the timing generator.

Still optionally, the CCD driving system may include a monitoring system that monitors the CCD driving circuit to determine whether the CCD driving circuit is in a normal operating condition or in an abnormal operating condition. In this case, the controller turns on the switching element when the monitoring system determines that the CCD driving circuit is in the abnormal operating condition.

In a particular case, the timing generator may be configured to hold the pulse signal supplied to the CCD driving circuit at a ground level when the output voltage of the voltage regulator is lower than a first voltage which is lower than the preset power supply voltage and higher than or equal to the predetermined voltage.

BRIEF DESCRIPTION OF THE ACCOMPANYING DRAWINGS

The objects and features of the present invention will become more apparent from the consideration of the following detailed description taken in conjunction with the accompanying drawings, in which.

DETAILED DESCRIPTION OF THE EMBODIMENTS

Figure 1:
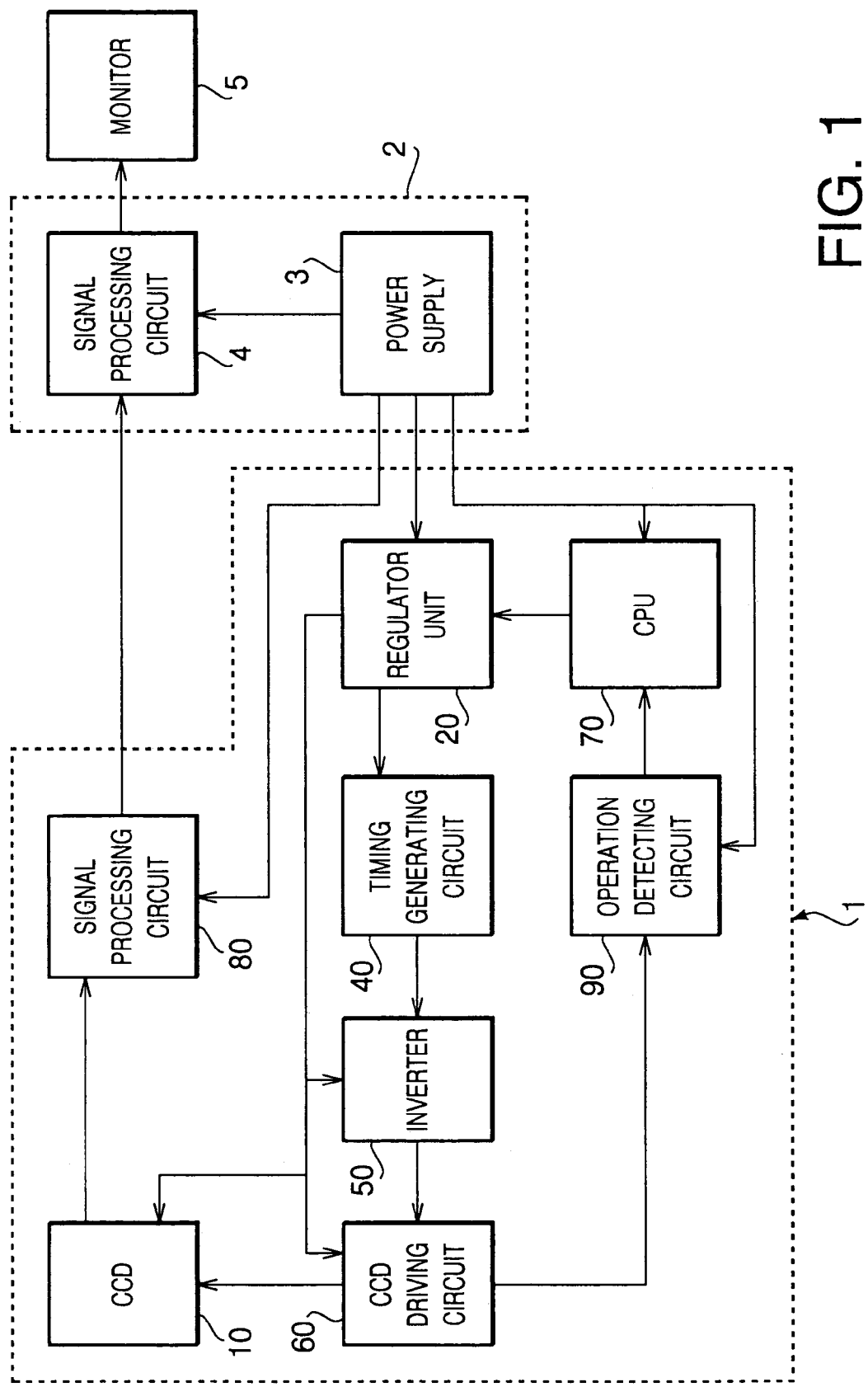
FIG. 1 is a block diagram showing the composition of an electronic endoscope as an example of an electronic device including a power supply voltage reduction system in accordance with an embodiment of the present invention.

Referring now to the drawings, a description will be given in detail of preferred embodiments in accordance with the present invention.

FIG. 1 is a block diagram showing the composition of an electronic endoscope 1 as an example of an electronic device including a power supply voltage reduction system in accordance with an embodiment of the present invention. The electronic endoscope 1 shown in FIG. 1 includes a regulator unit 20, a timing generating circuit 40, an inverter 50, a CCD 10, a CCD driving circuit 60, a CPU 70, a signal processing circuit 80 and an operation detecting circuit 90. The electronic endoscope 1 is electrically connected to a power supply unit 3 and a signal processing circuit 4 provided in an electronic endoscope processor 2. The signal processing circuit 4 of the processor 2 is connected to a monitor 5.

The CCD 10 is connected to the CCD driving circuit 60. The CCD driving circuit 60 sends a CCD drive signal to the CCD 10 and thereby control the CCD 10. An optical image is formed on the photoreceptor surface of the CCD 10 by the functions of a lighting optical system (unshown) and an objective optical system (unshown) of the electronic endoscope 1. The optical image is converted by the CCD 10 to an electric signal, and the electric signal is sent to the signal processing circuit 80.

The signal processing circuit 80 generates an image signal by processing the electric signal from the CCD 10 and sends the image signal to the signal processing circuit 4 of the processor 2. The signal processing circuit 4 of the processor 2 converts the image signal into a video signal (e.g., an NTSC signal) by processing the image signal and outputs the video signal to the monitor 5.

The power supply 3 is connected to the signal processing circuit 4, the signal processing circuit 80, the regulator unit 20, the CPU 70 and the operation detecting circuit 90 for supplying them electric power. The regulator unit 20 supplies proper power supply voltage to the timing generating circuit 40, the inverter 50, the CCD driving circuit 60 and the CCD 10.

The timing generating circuit 40 (e.g., a linear CCD clock driver TB62801F (Toshiba Corporation)) is a driver for CCD input signals. The timing generating circuit 40 converts input current into a pulse signal and sends the pulse signal to the inverter 50. The inverter 50 inverts the phase of the pulse signal and supplies the inverted pulse signal to the CCD driving circuit 60. Incidentally, while the embodiment of FIG. 1 employs the inverter 50 since polarities of an output terminal of the timing generating circuit 40 and an input terminal of the CCD driving circuit 60 are opposite to each other, the inverter 50 is unnecessary when the polarity of the input terminal of the CCD driving circuit 60 is identical with that of the output terminal of the timing generating circuit 40.

The operation detecting circuit 90 determines whether or not the CCD driving circuit 60 is in a normal operating condition by, for example, detecting periodic drive pulses outputted by the CCD driving circuit 60. The CPU 70 is constantly informed of the result of a determination by the operation detecting circuit 90 and thereby grasps an operating condition of the CCD driving circuit 60.

When an occurrence of a certain failure of the CCD driving circuit 60 is detected (i.e., when the CCD driving circuit 60 is in an abnormal electric condition or a malfunction), the CPU 70 controls the regulator unit 20 (including part of the power supply voltage reduction system) to reduce the power supply voltage to almost 0V and thereby protects the CCD driving circuit 60. The reduction of power supply voltage disables the CCD driving circuit 60, by which the CCD 10 is protected from the CCD driving circuit 60 operating abnormally.

Figure 2:
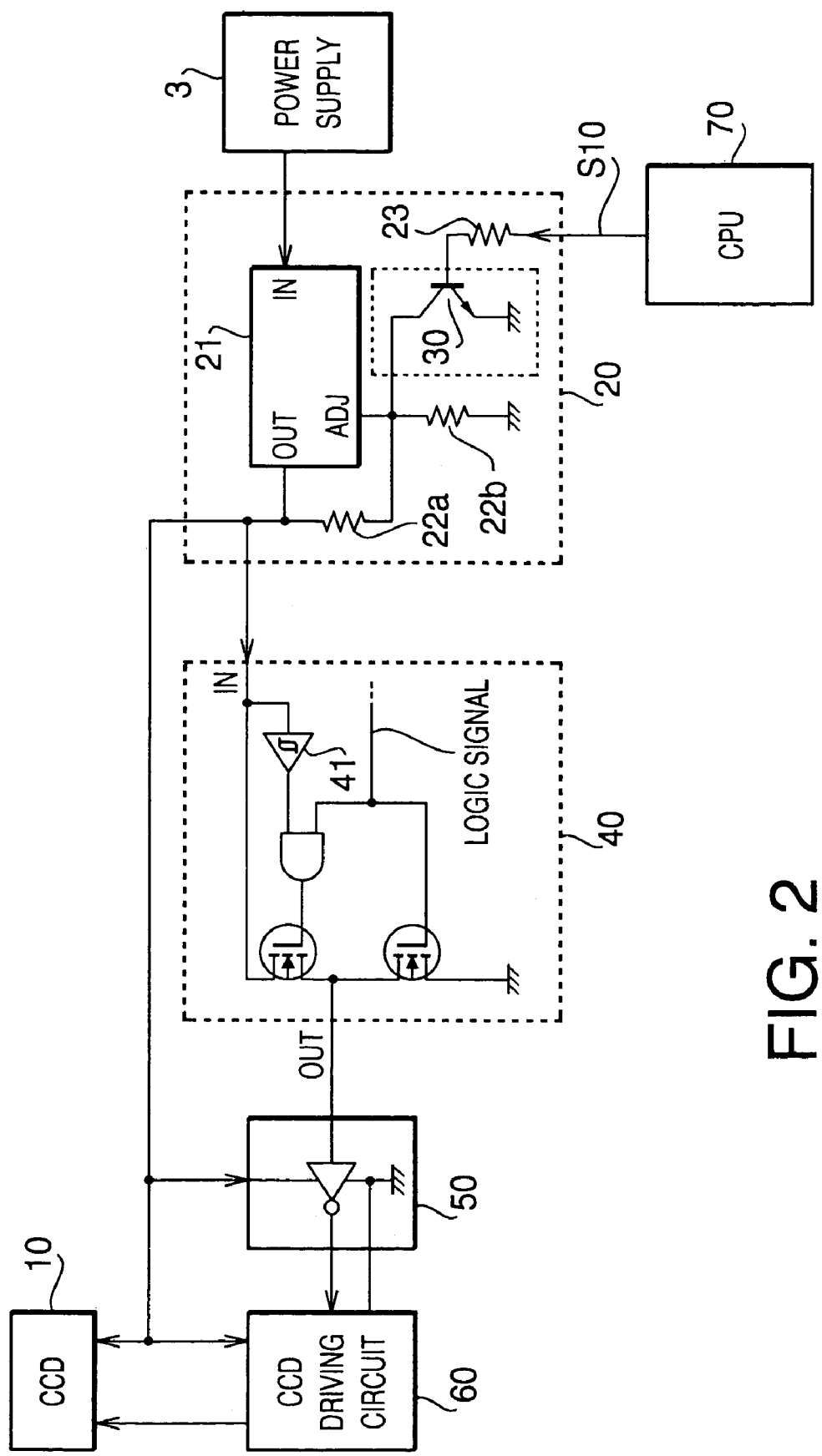
FIG. 2 is a block diagram showing an example of detailed composition around a regulator unit and a timing generating circuit of the electronic endoscope of FIG. 1.
Figure 3:
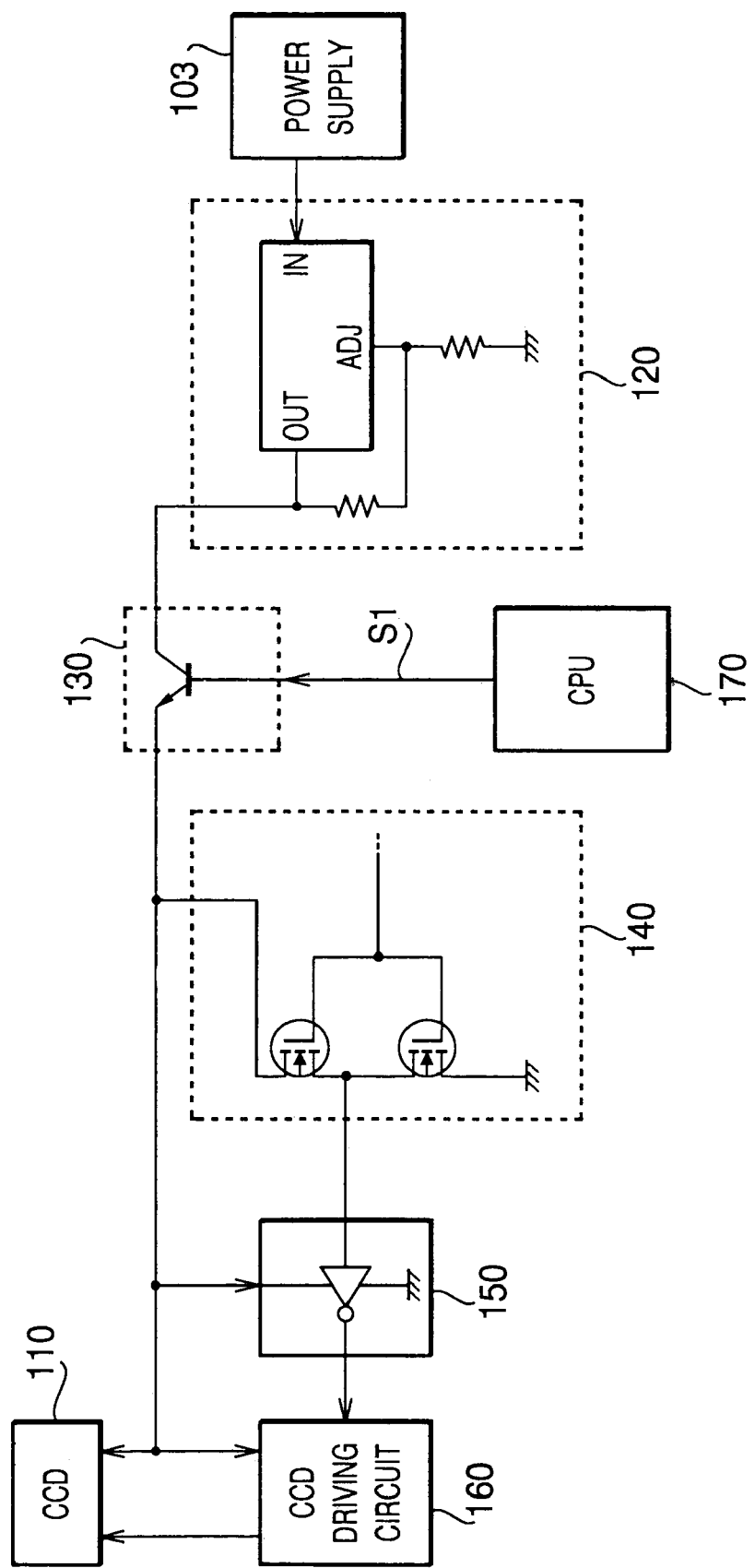
FIG. 3 is a circuit diagram showing an example of a conventional power supply interruption device which interrupts power supply to a CCD driving circuit of an electronic endoscope.

In the following, the operation of the power supply voltage reduction system will be described in detail. FIG. 2 is a block diagram showing an example of detailed composition around the regulator unit 20 and the timing generating circuit 40 of the electronic endoscope 1. In the example of FIG. 2, the input terminal of a regulator IC (three-terminal regulator) 21 is connected to the power supply 3, and the output terminal of the regulator IC 21 is connected to the timing generating circuit 40, the inverter 50, the CCD driving circuit 60 and the CCD 10.

The output terminal and an ADJ terminal (output voltage setting (adjustment) terminal) of the regulator IC 21 are connected together via a first resistor 22a. The ADJ terminal of the regulator IC 21 is connected to a ground via a second resistor 22b. Thus, the first resistor 22a and the second resistor 22b constitute an output voltage setting circuit of the regulator IC 21 (i.e., a circuit for setting the output voltage of the regulator IC 21). The ADJ terminal of the regulator IC 21 is also connected to the collector of a switching element 30.

The CPU 70 has a control signal output terminal for outputting a control signal S10. The control signal output terminal is connected to a base of the switching element 30 via a proper resistor 23. An emitter of the switching element 30 is connected to the ground. In short, the ON/OFF switching of the switching element 30 is controlled by the control signal S10 outputted by the CPU 70.

The switching element 30 remains OFF when the CPU 70 applies no voltage to the base of the switching element 30. The voltage $V_O$ at the output terminal of the regulator IC 21 is expressed by an equation:

$$V_o = V_{REF} \times \left(1 + \frac{R_2}{R_1}\right) + R_2 \times I_{ADJ} \qquad (1)$$

where "$V_{REF}$" denotes a reference voltage of the regulator IC 21, "$I_{ADJ}$" denotes electric current passing through the ADJ terminal, "$R_1$" denotes resistance of the first resistor 22a, and "$R_2$" denotes resistance of the second resistor 22b.

Thus, the voltage $V_O$ at the output terminal of the regulator IC 21 (i.e., the regulator unit 20) can be held at a proper voltage that is determined by values of $R_1$, $R_2$ and $V_{REF}$. Incidentally, $R_1$ and $R_2$ of the first and second resistors 22a and 22b are set sufficiently higher than internal resistance of the switching element 30 when it is ON (which will be explained later).

Meanwhile, when the CPU 70 turns the switching element 30 ON by applying a certain voltage to the base of the switching element 30, the internal resistance of the switching element 30 when it is ON will be added in parallel with the resistance $R_2$ of the second resistor 22b. In this case, almost all the current $I_{ADJ}$ from the ADJ terminal of the regulator IC 21 head for the switching element 30 since the internal resistance of the switching element 30 when it is ON is sufficiently smaller than $R_2$ of the second resistor 22b as mentioned above. Therefore, the output terminal voltage $V_O$ can be obtained by the following equation (2) using combined resistance $R_M$ of the internal resistance of the switching element 30 and the second resistor 22b.

$$V_o = V_{REF} \times \left(1 + \frac{R_M}{R_1}\right) + R_M \times I_{ADJ} \qquad (2)$$

Incidentally, the output terminal voltage $V_O$ obtained from the equation (2) is smaller than $V_O$ obtained from the equation (1) since $R_M < R_2$.

In the equation (2), $R_M/R_1$ and $R_M \times I_{ADJ}$ are approximately 0 since the internal resistance of the switching element 30 when it is ON and the current $I_{ADJ}$ are extremely small. Thus, the output terminal voltage $V_O$ of the equation (2) is substantially equal to the reference voltage $V_{REF}$. While the reference voltage $V_{REF}$ varies depending on the type of the regulator, $V_{REF}$ can be set to 1.25V (i.e., a normal voltage for the reference voltage $V_{REF}$) when, for example, a positive-output three-terminal regulator NJM317 (New Japan Radio Co., Ltd.) is used.

Since the reference voltage $V_{REF}$ in this embodiment is set far lower than an operating voltage (i.e., a lowest power supply voltage that enables the timing generating circuit 40, the inverter 50, the CCD driving circuit 60 and the CCD 110 to operate), power supply to the CCD driving circuit 60 and the CCD 10 is practically interrupted when the switching element 30 is ON. In this embodiment, the emitter of the switching element 30 is connected to the ground, therefore, the ON/OFF control of the switching element 30 can be performed easily with reference to the ground level.

The timing generating circuit 40 includes a circuit element 41 for preventing malfunction occurring when the power is turned on. The circuit element 41 holds an output voltage of the timing generating circuit 40 at the ground level (regardless of the value of a logic signal to be outputted from the timing generating circuit 40) as long as the power supply voltage $V_O$ supplied from the regulator unit 20 to the timing generating circuit 40 is lower than a certain threshold voltage. Thus, the operation voltage of the timing generating circuit 40 (a lowest power supply voltage capable of enabling the timing generating circuit 40) is higher than the threshold voltage. In this embodiment, the threshold voltage is set higher than the reference voltage $V_{REF}$.

In the composition described above, when the switching element 30 is OFF, the output terminal voltage $V_O$ obtained from the equation (1) is supplied to the CCD 10, the CCD driving circuit 60, inverter 50 and the timing generating circuit 40, by which the inverter 50 outputs a pulse signal for driving the CCD driving circuit 60. In this case, the switching element 30 is in its OFF state, and thus the switching element 30 causes no change to the output voltage of the regulator unit 20.

In this state, if the certain failure occurs in the CCD driving circuit 60, the switching element 30 is turned ON by the control signal S10 of the CPU 70 and the output terminal voltage $V_O$ of the regulator unit 20 (obtained from the equation (2)) changes to the reference voltage $V_{REF}$, by which power supply to the timing generating circuit 40, the inverter 50, the CCD driving circuit 60 and the CCD 10 is practically interrupted and thereby the CCD driving circuit 60 and the CCD 10 are protected.

Incidentally, in this embodiment, $R_1$ and $R_2$ of the first and second resistors 22*a* and 22*b* are set sufficiently higher than the internal resistance of the switching element 30 when it is ON so that the power supply voltage $V_O$ will be approximately $V_{REF}$ which is sufficiently lower than the operation voltage of the CCD 10, the CCD driving circuit 60, the inverter 50 and the timing generating circuit 40.

However, the settings of $R_1$ and $R_2$ are not limited to the above example as long as the voltage $V_O$ when the switching element 30 is OFF (obtained from the equation (1)) is sufficiently higher than the operation voltage of the timing generating circuit 40, inverter 50, CCD driving circuit 60 and the CCD 10 and the voltage $V_O$ when the switching element 30 is ON (obtained from the equation (2)) is lower than the operation voltage.

The power supply voltage $V_O$ outputted by the regulator unit 20 falls below the aforementioned threshold voltage when the switching element 30 is turned ON, by which the output voltage of the timing generating circuit 40 is fixed at the ground level. Therefore, ill effects by a leak of a HI-output (a high-level output) of the timing generating circuit 40 to the CCD driving circuit 60 (for example, excessive power consumption, malfunctions, etc. caused by a latch up in the CCD driving circuit 60) can be prevented.

By the above embodiment in accordance with the present invention, a switching element is turned ON in response to the occurrence of the certain failure in the electronic device (e.g. the electronic endoscope 1) and thereby the voltage supplied to a particular circuit (e.g., the CCD driving circuit 60 and the CCD 10) is reduced to a preset voltage lower than the power supply voltage that is supplied to the particular circuit in the normal state of the electronic device.

Therefore, in case of the certain failure, the particular circuit of the electronic device can be protected by reducing the output voltage of the three-terminal regulator (e.g. regulator IC 21) to a low voltage that can not cause ill effects on the particular circuit. In the normal state, the switching element stays OFF and thus causes no change to the voltage at the output voltage setting terminal (the ADJ terminal) of the three-terminal regulator, by which a power supply voltage according exactly to the setting by the output voltage setting circuit can be obtained in the normal state. Further, since the output voltage setting terminal of the three-terminal regulator is connected to the ground directly or via a low resistance, the ON/OFF control of the switching element can be performed easily with reference to the ground level.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

The present disclosure relates to the subject matter contained in Japanese Patent Application No. P2003-045071, filed on Feb. 21, 2003, which is expressly incorporated herein by reference in its entirety.

What is claimed is:

1. A CCD driving system comprising:
    a CCD driving circuit that outputs a driving signal for driving a CCD;
    a timing generator that generates and outputs a pulse signal for driving said CCD driving circuit;
    a voltage regulator that supplies a preset power supply voltage to said CCD driving circuit and said timing generator;
    an output voltage setting circuit that is connected to said voltage regulator to adjust an output voltage of said voltage regulator;
    a switching element that is used to connect an output voltage setting terminal of said voltage regulator to a ground via a predetermined resistance; and
    a controller that controls an on/off state of said switching element, said controller switches said switching element to one of the on and off states so that the output voltage of said voltage regulator is reduced to a predetermined voltage which is lower than the preset power supply voltage, the predetermined voltage and the preset power supply voltage being functions of resistance values of the output voltage setting circuit,
    wherein said timing generator is configured to hold the pulse signal supplied to said CCD driving circuit at a ground level when the output voltage of said voltage regulator is lower than a first voltage which is lower than the preset power supply voltage and higher than or equal to the predetermined voltage.

2. The CCD driving system according to claim 1,
    wherein said controller turns off said switching element so that the output voltage of said voltage regulator is set at the preset power supply voltage for enabling said CCD driving circuit and said timing generator, and turns on said switching element so that the output voltage of said voltage regulator is reduced to the predetermined voltage lower than the preset power supply voltage.

3. The CCD driving system according to claim 1,
    wherein the predetermined voltage is substantially equal to a reference voltage of said voltage regulator, the reference voltage being lower than an operating voltage of said CCD driving circuit and said timing generator.

4. The CCD driving system according to claim 1, further comprising a monitoring system that monitors said CCD driving circuit to determine whether said CCD driving circuit is in a normal operating condition or in an abnormal operating condition,
    wherein said controller turns on said switching element when said monitoring system determines that said CCD driving circuit is in the abnormal operating condition.

* * * * *